US008818431B2

(12) United States Patent
Schmidt et al.

(10) Patent No.: US 8,818,431 B2
(45) Date of Patent: Aug. 26, 2014

(54) TRANSMISSION OF A USEFUL DATA OBJECT FROM A SWITCHING COMPONENT TO A MOBILE STATION

(75) Inventors: Andreas Schmidt, Braunschweig (DE); Markus Trauberg, Velchede (DE); Sabine Van Niekerk, Salzgitter (DE)

(73) Assignee: Intel Mobile Communications GmbH, Neubiberg (DE)

( * ) Notice: Subject to any disclaimer, the term of this patent is extended or adjusted under 35 U.S.C. 154(b) by 932 days.

(21) Appl. No.: 10/565,089

(22) PCT Filed: Jul. 5, 2004

(86) PCT No.: PCT/EP2004/051358
§ 371 (c)(1),
(2), (4) Date: Jan. 18, 2006

(87) PCT Pub. No.: WO2005/011311
PCT Pub. Date: Feb. 3, 2005

(65) Prior Publication Data
US 2007/0111721 A1    May 17, 2007

(30) Foreign Application Priority Data
Jul. 18, 2003   (DE) .................................. 103 32 838

(51) Int. Cl.
*H04W 4/00*     (2009.01)
*H04L 12/58*    (2006.01)

(52) U.S. Cl.
USPC ........................................ 455/466; 455/412.1

(58) Field of Classification Search
USPC ........... 455/466, 558, 406–408, 412.1–412.2, 455/432.1–44
See application file for complete search history.

(56) References Cited

U.S. PATENT DOCUMENTS

| 6,014,561 A * | 1/2000 | Molne ........................... 455/419 |
| 6,188,887 B1 | 2/2001 | Joong et al. |
| 6,556,823 B2 | 4/2003 | Clapton et al. |

(Continued)

FOREIGN PATENT DOCUMENTS

| DE | 102 23 205 | 12/2003 |
| DE | 10223205 | 12/2003 |
| WO | WO 99/21392 | 4/1999 |
| WO | WO 01/33782 A1 * | 10/2001 |
| WO | WO 03/058991 | 7/2003 |
| WO | WO 2004/054294 | 6/2004 |

OTHER PUBLICATIONS

XP002300813—Orange, T-Mobile, Telefonica "Conditional delivery behaviour" Jul. 7, 2003, pp. 1-4.

(Continued)

*Primary Examiner* — George Eng
*Assistant Examiner* — Nam Huynh
(74) *Attorney, Agent, or Firm* — Schwabe, Williamson & Wyatt, P.C.

(57) ABSTRACT

A method for transmission of a useful data object from an exchange component to a mobile station, whereby a communication network is elected, in which the useful data object is to be transmitted and the exchange component transmits the useful data object to the mobile station when it is determined that said the mobile station is hooked into the at least one communication network and it is determined that the exchange component has a delivery request for the useful data object. A mobile station, an exchange component and a telecommunication device, are further disclosed, where each is embodied such as to be able to carry out such a method.

12 Claims, 3 Drawing Sheets

(56) References Cited

U.S. PATENT DOCUMENTS

| | | | |
|---|---|---|---|
| 6,567,667 B1* | 5/2003 | Gupta et al. | 455/445 |
| 6,678,361 B2* | 1/2004 | Rooke et al. | 379/93.24 |
| 7,392,039 B2* | 6/2008 | Souissi et al. | 455/412.2 |
| 2001/0005675 A1* | 6/2001 | Aho | 455/412 |
| 2002/0025821 A1 | 2/2002 | Clapton et al. | |
| 2003/0095540 A1 | 5/2003 | Nykanen et al. | |
| 2003/0114149 A1 | 6/2003 | Lehtonen et al. | |
| 2003/0129971 A1 | 7/2003 | Gopikanth | |
| 2003/0186695 A1* | 10/2003 | Bridges et al. | 455/432 |
| 2003/0217174 A1* | 11/2003 | Dorenbosch et al. | 709/237 |
| 2004/0111476 A1* | 6/2004 | Trossen et al. | 709/206 |

OTHER PUBLICATIONS

XP002300814—3GPP 3$^{rd}$ Generation Partnership Project: Technical Specification Group Terminals; Multimedia Messaging Service (MMS); Functional description, Stage Release 6—Jun. 2003, pp. 1-15-20, 23-24, 26-27, 48-50.

German translation of Office Action issued on Jul. 30, 2010 in the parallel Chinese patent application.

Nokia: "Conditional delivery behaviour", TSG-SA WG1 SWG-21, TDOC S1-030884, Jul. 17, 2003, p. 1 to 4, XP050220929.

* cited by examiner

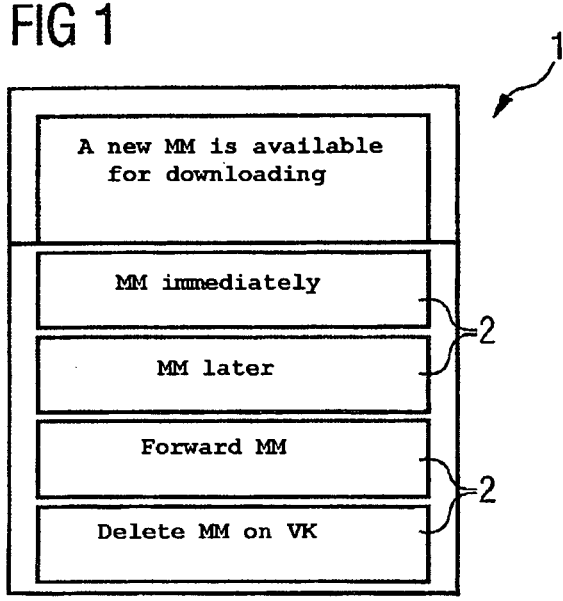
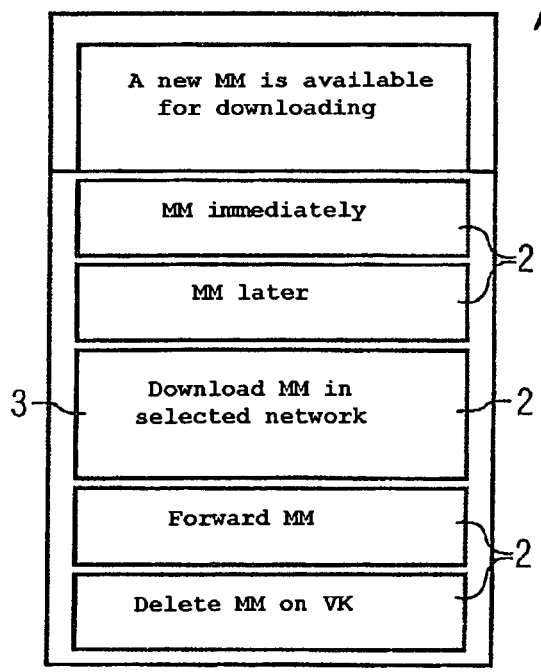

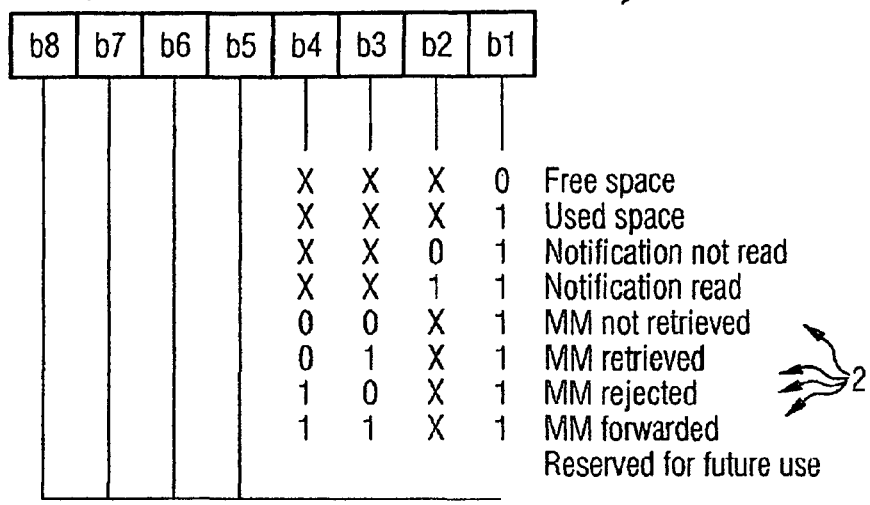
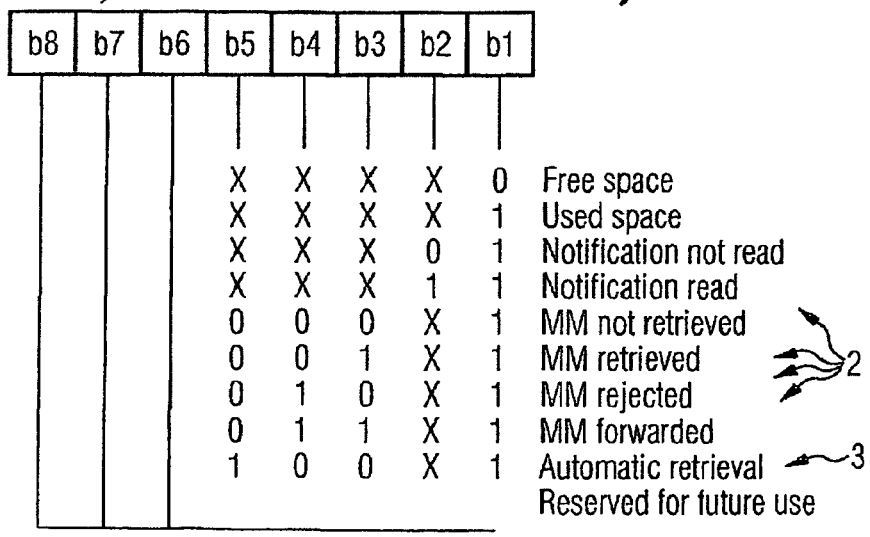

TRANSMISSION OF A USEFUL DATA OBJECT FROM A SWITCHING COMPONENT TO A MOBILE STATION

FIELD OF TECHNOLOGY

The present disclosure relates to a method, a mobile station, a switching component and a telecommunication arrangement for transmitting a useful data object from a switching component to a mobile station.

BACKGROUND

Useful data objects, such as multimedia messages, are transmitted from a switching component, such as a server of a transmission service provider, to mobile stations, such as telecommunication devices. The switching component thereby serves as an exchange for a useful data object from a provider to a mobile station or between two mobile stations.

In the case of services, such as the multimedia messaging service (MMS) for example, useful data objects with a sizeable content are transmitted. MMS content comprises one or a number of elements, such as text, voice or image elements or video information, etc. The multimedia messaging service (MMS) is standardized by the 3GPP (3rd Generation Partnership Project) or the OMA (Open Mobile Alliance), successor organizations of the WAP Forum, and is already deployed in some networks, e.g. the mobile radio network. The multimedia messaging service specified by the 3GPP or OMA is able to switch and transmit multimedia messages to and from mobile stations.

Until now, useful data objects were transmitted in a network from a switching component to a mobile station in two steps. First the mobile station is notified by the switching component that a new useful data object is available for downloading on the switching component. The user of the mobile station can respond to the message in two ways. They can either reply with a confirmation that they have received the notification, or request the useful data object directly, by sending a delivery request for the useful data object to the switching component. In the first instance described, the useful data object remains on the switching component and can be requested later by the mobile station, as described in the second variant, i.e. with a delivery request from the mobile station to the switching component. After the delivery request has been sent, the switching component responds by transmitting the useful data object to the mobile station. This means that the user can choose between immediate downloading and downloading at a later time.

Every mobile station is assigned to a network operator in a locally defined communication network, generally within the boundaries of a country. This communication network is also referred to as the home network or home PLMN (Public Land Mobile Network). These are public, land-based mobile radio networks, in which the mobile station can register, to receive useful data objects or messages. The home PLMN is the area in which services are provided by network operators. The user has concluded an agreement with the network operator of the home PLMN or one of its contracting partners to use the communication network. Communication networks outside the home network are frequently referred to as external networks.

The receipt of useful data objects, e.g. MMS messages, in a home network is generally associated with costs. When the mobile station is operated in an external communication network, i.e. when roaming, the costs of receiving useful data objects can differ significantly from those in the home network. Roaming refers to the movement of the mobile station into a communication network outside the home network, i.e. the transfer of the mobile station into an external network. A common instance of this is so-called international roaming, when the corresponding communication networks are operated within the boundaries of a country. It is however also possible for the transfer between two communication networks to take place within one country. The receipt of a useful data object when roaming, i.e. in an external network, is frequently associated with significantly higher costs than the receipt of the same useful data object when the mobile station is registered in the home network of the user. The charges frequently vary significantly from communication network to communication network.

The user of a mobile station can choose to download the useful data object immediately or later. No distinction is made during receipt of a useful data object between whether the mobile station is registered in the home network or in another communication network. Many implementations are designed or can be configured such that on receipt of a notification, the mobile station automatically downloads the associated useful data object. The disadvantage here is that if, on receipt of a notification that a useful data object is available for downloading on a switching component, the user downloads the useful data object immediately, they incur high charges when they are in a communication network outside their home network. If the user decides to download later, for example when the mobile station has once again registered in the home network, said user must remember that there is still a useful data object to be retrieved on the switching component.

SUMMARY

A user-friendly option is disclosed for a user to transmit useful data objects or messages from a switching component to a mobile station.

A method for transmitting a useful data object from a switching component to a mobile station is disclosed, wherein at least one communication network is selected, in which the useful data object is to be transmitted. The switching component transmits the useful data object to the mobile station, when it is determined that the mobile station has registered in one of the selected communication networks and it is determined that the switching component has a delivery request for the useful data object.

At least one communication network is selected, in which the available useful data object is to be transmitted. All communication networks provided by network providers can be selected in this process. In other words, the selection can be made as a function of network providers and not just by network providers themselves. The communication networks can thereby be operated within the boundaries of a country, across more than one country or in a regionally defined area of a country. The user of the mobile station has the option of selecting one or more communication networks, in which they would like to receive the useful data object. Selection of the communication networks can be extended or limited at any time. The user of the mobile station has the option of selecting communication networks, in which a useful data object is transmitted at low cost for example. Communication networks, in which the transmission of a useful data object would incur high costs, can be excluded by the user, i.e. the user can block useful data objects being sent to them in these communication networks.

Transmission of the useful data object from the switching component to the mobile station is also a function of two conditions. Firstly it must be determined whether the mobile station has registered in one of the selected communication networks. As a second condition, the switching component must have a delivery request to the effect that the user would like to have the useful data object delivered in a previously selected communication network. Only when both conditions are satisfied does the switching component transmit the useful data object to the mobile station. This method creates a user-friendly, individual and cost-effective option for transmitting useful data objects for the user. As well as having the option of downloading the useful data object immediately or at a later time, the user also has the option of receiving the useful data object after the mobile station has registered in a communication network they have themselves selected.

The switching component is preferably a server of a transmission service in the network. The mobile station can, for example, be configured as a mobile telephone, a cordless telephone, a smart phone, representing a combination of a small portable computer and a mobile telephone, a PDA or an organizer.

The mobile station can also include other available mobile devices, e.g. a personal computer or laptop. All mobile stations can be used in a network, e.g. a mobile radio network or an internet-protocol-based communication network. The mobile radio network can thereby operate according to the GSM (Global System for Mobile Communication) standard or the UMTS (Universal Mobile Telecommunications System) standard. The possibility of wide geographical coverage is an advantage here. Local communication networks, like wireless LAN (Wireless Local Area Network), can also be used. Local communication networks are systems for high-performance information transfers, which allow a number of users with equal priority to carry out a high quality partnership-based message exchange in a spatially limited area using a fast transmission medium. The mobile stations each have a radio module or a mobile radio module or are linked to a radio module or a mobile radio module. It is thus possible for the switching component to be located in an internet-protocol-based network, in which the data, i.e. the useful data objects, can be transmitted via a WAP gateway or similar and ultimately via an air interface of a radio network to the mobile station.

The user of the mobile station can send the switching component a general delivery request for all available useful data objects. The switching component then sends a new useful data object directly to the mobile station, when it has been determined that the mobile station has registered in one of the selected communication networks. However a method for transmitting useful data objects from a switching component to a mobile station is preferred, in which the mobile station is notified by the switching component, when the switching component has a useful data object for the mobile station. The user of the mobile station is hereby informed of a new useful data object on the switching component. After being informed that a new useful data object is available, the user of the mobile station has the option of sending an individual delivery request for the useful data object to the switching component. If there is no interest in the transmission of the useful data object, the user of the mobile station does not send a delivery request to the switching component. Notifying the switching component provides the user of the mobile station with an additional selection option of deciding whether or not they wish to receive the available useful data object.

A method is also disclosed, wherein at least one communication network is selected using a selection device, with the selection device being assigned to the mobile station or the switching component. The selection device registers the communication networks input by the user and makes them available to the mobile station and/or the switching component for further processing. The selection device can thereby predefine for selection by the user all the possible communication networks in which the mobile station could register. The selection can be made directly in the mobile station or in the switching component or by means of a selection device assigned to the mobile station or the switching component. Selection of the communication networks is hereby supported by a software application on the mobile station, on the switching component and/or on the selection device assigned to the mobile station or the switching component. The communication network of the network provider, with which the user of the mobile station has concluded the usage agreement, is generally the so-called home PLMN, the first selected communication network. The user of the mobile station can conclude a mobile radio agreement directly with the operator of the home PLMN or with a contracting partner of the operator. The selection of the home PLMN as the first communication network can be made by the user themselves or can be predefined automatically.

In an alternate embodiment for transmitting a useful data object from a switching component to a mobile station, at least one communication network is selected as a function of at least one parameter, preferably arranged as a parameter for example representing the cost of transmitting the useful data object, the transmission time for the useful data object, the size of the useful data object, the sender of the useful data object or the nature of the useful data object. Selection of the communication network(s) can be made a function of different parameters. For example the user can predefine that they only wish to receive a useful data object, if transmission of the useful data object does not cost more than a specified sum. The user can predefine a cost limit, which cannot be exceeded. The user can also elect that the transmission time for the useful data object cannot exceed a certain time limit. The user can block the transmission of specific useful data objects, electing that only useful data objects of a specific nature, e.g. only text and image messages, are to be transmitted. The user can also restrict transmission to selected senders of the useful data object or block the transmission of useful data objects from specified senders. Transmission can be made a function of any number of parameters. This gives the user a simple control option, allowing them to specify that not every useful data object is to be transmitted to the mobile station for them. The at least one parameter can be input during selection of the communication network(s). The parameters can also be selected by means of a software application, preferably the same software application used for the selection of the communication networks, on the mobile station, on the switching component and/or a selection device assigned to the mobile station or the switching component. The parameter selection can be amended at any time.

A determination device assigned to the mobile station or the switching component may also determine whether the mobile station is registered in one of the selected communication networks. The determination device can thereby be part of the mobile station or part of the switching component. Alternatively the determination device can be arranged so that it is spatially separated from the mobile station or the switching component but it is assigned to the mobile station and/or the switching component. The determination device registers any change of communication network. As soon as the mobile station registers in another communication network, the determination device compares this communication network with the selected communication networks to determine any correspondence.

If the determination device on the mobile station determines that the mobile station has registered in one of the selected communication networks, a software application, a so-called user agent, on the mobile station is notified directly of this. Furthermore, the determination device may also notify the mobile station that the mobile station has registered in one of the selected communication networks, when it is determined either by the switching component or by the assigned determination device that the mobile station has registered in one of the selected communication networks. This informs the mobile station that it has registered in a selected communication network.

Furthermore, the mobile station may send to the switching component the delivery request for the useful data object, either when the mobile station determines that the mobile station has registered in one of the selected communication networks, or the mobile station is notified by the determination device assigned to the switching component that the mobile station has registered in one of the selected communication networks. The delivery request is sent from the mobile station to the switching component immediately after the mobile station has been informed of registration in a selected communication network. The delivery request represents a message to the switching component, to the effect that the mobile station wishes to receive the available useful data object. Informing the mobile station of its registration in a selected communication network is the trigger for sending the delivery request for the useful data object. Alternatively a further inquiry can be sent to the user of the mobile station, asking whether they wish transmission of the useful data object. If the user agrees, the mobile station sends the delivery request to the switching component. This means that an individual inquiry can be made, in addition to the presettings based on parameter selection. If this inquiry is not made, the delivery request is sent as a function of the selected parameters. The mobile station compares the information about the useful data object sent with the notification about the useful data object with the selected parameters. If the data for the useful data object corresponds to the selected parameters or does not exceed the selected parameters, the mobile station sends the delivery request to the switching component. Otherwise, if the data specific to the useful data object is outside the boundary areas of the selected parameters, the mobile station does not send a delivery request to the switching component and the useful data object is not transmitted.

In a further embodiment, the switching component transmits the useful data object to the mobile station, when the switching component is sent the delivery request for the useful data object by the mobile station or the switching component already has a delivery request. In other words, the switching component transmits the useful data object as soon as it receives the delivery request. If the switching component has a general delivery request for the useful data object, it transmits the useful data object to the mobile station, when it has been informed that the mobile station has registered in one of the selected communication networks. It is informed via a determination device assigned to the mobile station or itself.

The useful data object may be transmitted as a multimedia message (MM) in the context of the multimedia messaging service (MMS) between the switching component and the mobile station. This allows the transmission of useful data objects, which may include multimedia content with a large amount of data, such as digital photographs or video clips. Encrypted useful data objects and usage rights can also be transmitted.

Once notification is received, indicating that a useful data object is available the mobile station, options are displayed for the user to select, including useful data object being transmitted from the switching component immediately, at a later time or after registration of the mobile station in a previously selected communication network. The user has a further selection option, namely transmission of the useful data object when the mobile station registers in a previously selected network. This allows the user to download the useful data object immediately, once the mobile station has registered in a cheaper network for example. The user sees the different selection options in a display menu, on the display of the mobile station for example. Displaying the selection option allows the user of the mobile station to specify the transmission time for the useful data object or to reject transmission in a simple fashion. If the user is registered with the mobile station in a communication network, which said user has hitherto not selected, for a useful data object to be transmitted to them in this communication network, they have the option of making a selection on receipt of the notification of a new useful data object. This allows the list of selected communication networks to be extended. The list can be amended in an individual fashion at any time. Already selected communication networks can be deleted from the list. The display of selection options can thereby be configured such that the user can input their selection quickly by operating different available input keys.

In yet another exemplary embodiment, the useful data object is sent from a data provision component to the switching component for transmission to the mobile station. A data provision component is a server of a service provider, e.g. a message service provider, sending useful data objects with specific, in particular multimedia, content. The data provision component makes a useful data object available to the operator of a communication network for forwarding to a mobile station. Interposition of the switching component ensures that not every useful data object is sent directly from the data provision component to the mobile station. As an alternative to the data provision component, a useful data object can also be sent from a second mobile station via the switching component to a first mobile station. This allows the exchange of useful data objects to be carried out in a simple fashion between two mobile stations.

A method is also advantageous, in which at least one of the following information items is stored in a storage unit assigned to the mobile station: the status of the transmission process of the useful data object, the at least one selected communication network, the selected parameter(s), the notifications and messages or information specific to the useful data object. All information items are preferably stored. Storage allows a later comparison of the input data with the data about the communication network determined by the determination device and the specific data of the useful data object. Depending on the method step, the stored data is accessed, a comparison is made and, depending on the result of the comparison, a corresponding further method step is carried out. The storage unit stores information about whether the useful data object has been requested from the switching component by the mobile station, whether it has not yet been requested, whether delivery of the useful data object has been rejected or whether it has already been transmitted. The storage unit also stores the list of selected communication networks, in which a useful data object is to be transmitted when the mobile station is registered in the communication network. The storage unit can thereby provide the user with a list of all possible, generally country-specific, communication networks, in which they can obtain transmission of a useful data object.

Storage is carried out on a storage unit assigned to the mobile station. It is also possible for storage to take place in a storage unit of the switching component, in another storage device connected to the mobile station, or directly in the mobile station. It is advantageous if storage takes place on a storage unit which can be inserted into the mobile station. The storage units used can be simple memory cards, e.g. multimedia cards, compact flash cards, memory sticks, etc.

It is particularly advantageous to use memory cards that are assigned to a specific user. Memory cards such as a SIM (Subscriber Identity Module) card or a UICC (Universal Integrated Circuit Card) card with a USIM (UMTS Subscriber Identity Module) application are particularly suitable for this purpose. If the mobile station is replaced, the stored information remains assigned to the user. In other words the user inserts the memory card assigned to them into a different mobile station. The data stored on the memory card is thereby retained.

The storage, receiving and sending of the useful data object, selection of the communication network, selection of the parameters and/or the display on the mobile station may also be carried out by a software application on the mobile station. The software application, a so-called user agent, operates as an interface between the mobile station and the switching component. The user agent is part of the mobile station and coordinates the operations to be carried out. In other words the user agent is informed by the switching component about the availability of a new useful data object, and ensures that the new information is displayed on the mobile station and deals with the further transmission process, as a function of the user's decision. The software steps of the software application are executed on a processor unit assigned to the mobile station.

The invention also relates to a mobile station with a selection device for selecting at least one communication network and with a determination device for determining whether the mobile station has registered in a selected communication network, the mobile station being designed to implement a claimed method. The selection device can be used to select at least one communication network. The selection device provides the user of the mobile station with a list of possible communication networks for selection on a display device. The selection device advantageously has an input device, in particular input keys in the form of projecting keys, soft keys, etc., by means of which a user of the mobile station can select the communication networks. The user's selection of the required communication networks is stored in a storage unit assigned to the mobile station. The selection device can also be used to select at least one parameter, which can be used to restrict delivery of the useful data object. The determination device determines the communication network, in which the mobile station is registered or determines a transfer of the mobile station into another communication network. To this end the determination device checks signals, which the mobile station receives from different base stations. These signals contain information specific to the communication network, which the determination device can use to determine the communication network in which the mobile station has registered. The determination device evaluates the signals received from base stations and determines when the mobile station registers in another communication network.

The selection device and the determination device are preferably linked via software applications to a processor device in the mobile station, which is set up such that the inputting of at least one communication network is stored, the selection is displayed graphically on the display device, the at least one selected communication network is compared with the input communication network and a delivery request is sent to the switching component. It is also advantageous for a storage unit of the mobile station to allow storage for example of the selected communication networks, the user-specific parameters and the status of transmission of the useful data object. The storage unit can be assigned permanently or non-permanently to the mobile station.

A switching component is also disclosed, which includes a selection device for selecting at least one communication network and a determination device for determining whether the mobile station has registered in a selected communication network is also created, with the switching component being designed to implement the methods determined above.

The mobile station and the switching component can also be operated in different telecommunication networks. Possible telecommunication networks can for example be mobile radio networks or wireless LAN networks. The telecommunication networks can thereby be configured in particular as internet-protocol-based networks. The telecommunication network can be configured as a mobile radio network, operating in particular according to the GSM or UMTS standard. The mobile station can be part of a first telecommunication network, which is configured either as a mobile radio network or a wireless LAN network. The switching component can be part of a second telecommunication network. If the mobile stations and switching component are part of different telecommunication networks, a method is preferred in which the telecommunication networks are connected together by a connecting component. Telecommunication networks or telecommunication devices according to the GSM standard or the UMTS standard can represent a platform for WAP (Wireless Application Protocol) protocols or the WAP protocol stack, by means of which useful data objects can be transmitted in the respective telecommunication network. When a WAP protocol stack is used, it is possible to create a connection by means of a WAP gateway as the interface or connecting component between two telecommunication networks, for example between a mobile radio network and another network, such as an internet-protocol-based network. This makes it possible for the connecting component to be part of an internet-protocol-based network, it being possible to transmit the useful data object via a WAP gateway and ultimately via an air interface of a mobile radio network between a base station of the mobile radio network and a user's mobile station. With the so-called "push" technology a message is delivered automatically by a provider. The mobile stations ideally have a radio module and are in particular configured as a mobile telephone, a cordless telephone, a portable computer or a PDA. The useful data object is sent from a data provision component to the switching component for transmission to the mobile station.

It is also advantageous for the switching component to be configured as an MMS relay server. In the context of the MMS service useful data objects are sent automatically from an MMS relay server as the switching component to a mobile station, for example by means of the so-called WAP push. WAP push means that the server or switching component autonomously transmits data to the mobile station without the mobile station sending a delivery request to the switching component or server beforehand. The MMS server serves as a so-called push indicator, which prompts an interface, a WAP gateway or a push proxy gateway to send a useful data object by WAP push to the mobile station, as soon as the mobile station has registered in the home network or a network previously selected for this purpose outside the home network.

A telecommunication arrangement is also disclosed, comprising at least one switching component and a mobile station, with the telecommunication arrangement being designed to implement the aforementioned methods. The individual components of the telecommunication arrangement can thereby operate in one network or in different networks.

It is advantageous for a mobile station, a switching component and a telecommunication arrangement to allow user-friendly transmission of a useful data object for a user. Operation is simple and the components allow the user for example to transmit useful data objects in a cost-effective fashion.

All the details mentioned in relation to the method also relate to the mobile station, the switching component and the telecommunication arrangement and vice versa.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 1 illustrates a display on a display device of a mobile station after receipt of a notification that a useful data object is available on the switching component when the mobile station has registered in a selected communication network;

FIG. 2 illustrates the display on a display device of a mobile station after receipt of a notification that a useful data object is available on the switching component, when the mobile station has not registered in a selected communication network;

FIG. 3 illustrates a first MMS status byte as defined in the specification 3G TS 31.102;

FIG. 4 illustrates a first MMS status byte as defined in the specification 3G TS 31.102 according to an exemplary embodiment.

DETAILED DESCRIPTION

Figure 5:
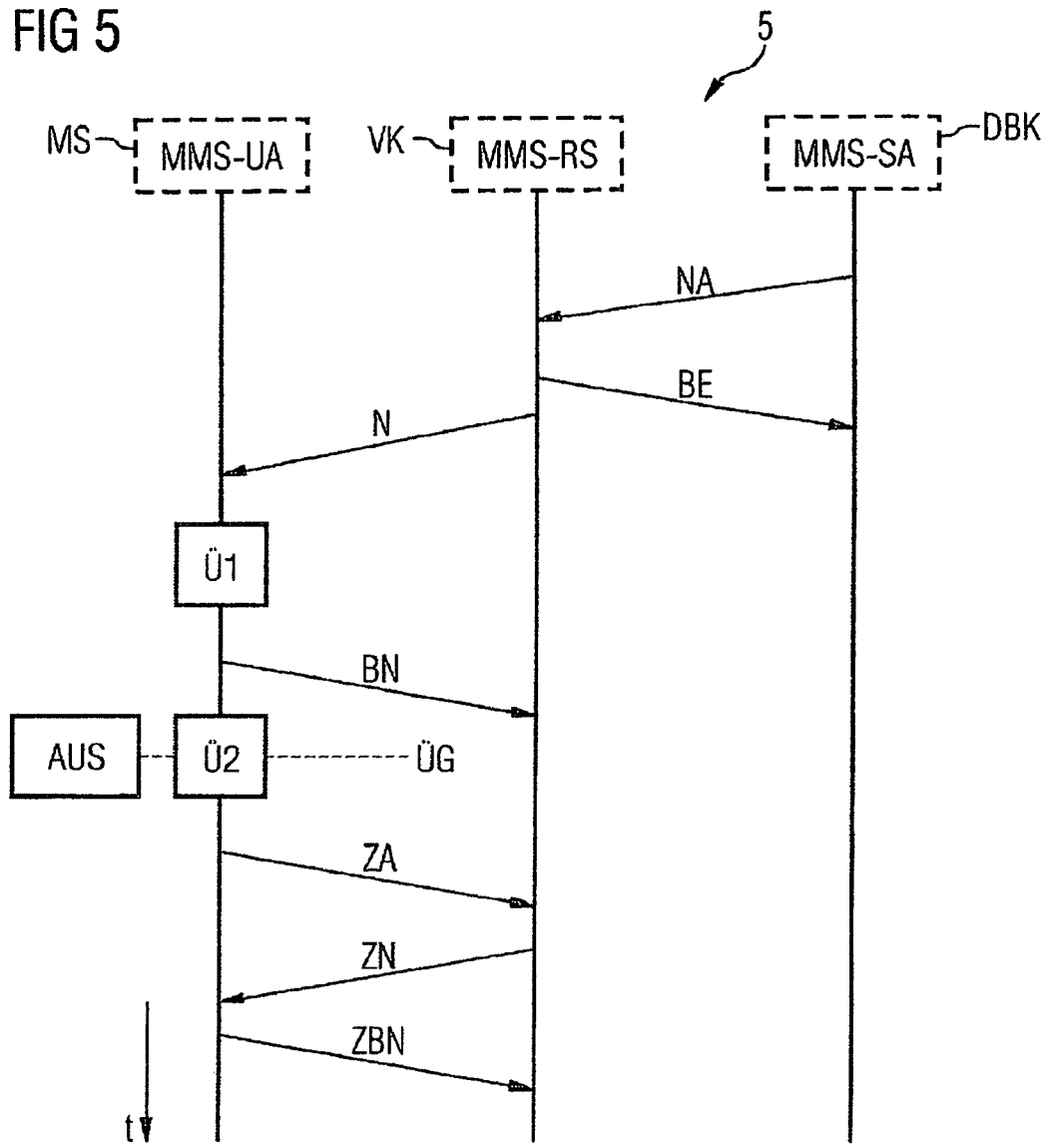
FIG. 5 illustrates a block circuit diagram representing the data flow for delivery of a useful data object, such as with multimedia content, according to the MMS transmission service.

FIG. 1 shows the display on the display device 1 of the mobile station MS, when a new useful data object is available for downloading on the switching component VK and when the mobile station MS is registered in a selected communication network. The mobile station MS informs the user with the aid of a user agent UA installed on the mobile station MS that a new useful data object, in this instance a new multimedia message MM, is available for downloading on the switching component VK, generally a server. Different options 2 are also displayed for the user. The user can download the multimedia message MM immediately, download the multimedia message MM later at an unspecified time, forward the multimedia message MM to another server or another mobile station MS or have the multimedia message MM deleted on the switching component VK. Input keys are assigned respectively to the displayed fields containing the various options 2. The user can select one of the options 2 by correspondingly selecting the input keys.

FIG. 2 shows the display on the display device 1 of the mobile station MS, when a new useful data object is available for downloading on the switching component VK and when the mobile station MS has not registered in a selected communication network. In this embodiment, the mobile station MS offers the user an extended display, when the mobile station MS has not registered in a selected communication network. In addition to the options 2 shown in FIG. 1, the mobile station MS offers the user the option 3, in other words downloading the multimedia message MM made available by the switching component VK, when the mobile station MS has registered in one of the previously selected communication networks, in which the user wishes to receive such useful data objects. The user's selection is stored individually by the user agent UA for every multimedia message MM in a storage unit on the mobile station MS. If the user elects to have an available multimedia message MM delivered to them after the mobile station MS has registered in a selected network, the mobile station MS sends a delivery request ZA to the switching component VK, as soon as the determination device FE assigned to the mobile station MS or the switching component VK has determined that registration in a selected communication network has taken place. After determining the availability of the delivery request ZA, the switching component VK then transmits the multimedia message MM to the mobile station MS. The user can choose whether they wish to be given the five possible options 2 described above for every useful data object offered by the switching component VK or whether specific options 2 are generally to be executed. In other words the user can set the user agent UA such that useful data objects are generally to be transmitted in a selected network. The user can for example determine beforehand that useful data objects over a specific size are to be downloaded after registration in a previously determined communication network. The user can input the determination of specific parameters, such as the size of the useful data objects, the transmission time for useful data objects, the nature of the useful data object or the sender of the useful data object, via the mobile station MS or via the switching component VK. The user can for example input a selection list of senders of useful data objects, from which they do not wish to receive useful data objects. The user can for example also specify that they only wish to receive useful data objects containing image messages.

FIG. 3 shows a first MMS status byte 4 as defined in the specification 3GPP TS 31.102, which is characteristic of a UMTS application. This first MMS status byte 4 is used to store four options 2 for transmitting or downloading useful data objects on the storage unit, which is assigned to a user. The four options 2 are: not retrieved, retrieved, rejected or forwarded. Further possible values of the first MMS status byte 4 are reserved for future use. A second MMS status byte (not shown) can also be reserved for future use. The user agent UA accesses the stored data and can read from this whether an option 2 has already been executed.

The claimed extension of the function of transmitting useful data objects, in particular the multimedia messaging service MMS, with which the user is offered a further option 3 when the mobile station MS is in communication networks outside the selected communication networks, is shown in FIG. 4. The first MMS status byte 4 also has a further line, in which the status "automatic downloading when the mobile station MS registers in a selected communication network" is stored. The status value "1" representing automatic downloading or the status value "0" representing not downloading is shown in the column b5.

FIG. 5 shows the pattern over time, according to the arrow t, of a data transmission system between a switching component VK and a mobile station MS of a telecommunication arrangement 5 for transmitting a useful data object, in particular with multimedia content, according to the MMS transmission service. The telecommunication arrangement 5 includes a data provision component DBK for providing or sending useful data objects, a switching component VK for temporarily storing and forwarding the useful data objects and a mobile station MS for receiving the useful data objects. The switching component VK is an MMS relay server MMS-RS, as in this example transmission of the useful data objects is to take place according to the multimedia messaging service MMS. In this example the data provision component DBK is a server of a service provider, e.g. a message provider, etc., which sends useful data objects with specific content to recipients. As an alternative to the data provision component DBK, a useful data object can also be sent from a second mobile station MS via the switching component VK to a first mobile station MS.

A software application is provided on each of the components of the telecommunication arrangement 5 and this is responsible for the data transmission and data processing shown in FIG. 5. A server application MMS-SA is provided on the data provision component DBK, a relay server application MMS-RS on the switching component VK and an MMS user application MMS-UA on the mobile station MS.

If a useful data object is available for the mobile station MS on the data provision component DBK, the data provision component DBK sends the corresponding useful data object by means of a message NA to the MMS relay server MMS-RS of the switching component VK. The MMS relay server MMS-RS of the switching component VK confirms receipt of the message NA with a confirmation message BE. In the present example the mobile station MS, to which the useful data object is to be sent, is first registered in a communication network outside the selected communication networks. After the useful data object has been sent from the data provision component DBK to the switching component VK, the MMS relay server MMS-RS of the switching component VK sends a message N, in particular by WAP push, to the mobile station MS. In the example shown the mobile station MS or its application MMS-UA at first only responds to the message N with a confirmation message BN, as in a first check Ü1 the user application MMS-UA has determined that the mobile station MS is not registered in a selected communication network. In the course of time the determination device assigned to the mobile station MS determines that the mobile station MS has registered in a selected communication network. The determination of the transfer of the mobile station MS into a selected communication network is forwarded by the determination device FE to the user application MMS-UA of the mobile station MS. This transfer from a so-called non-selected communication network into a selected communication network is shown as ÜG. The user application MMS-UA of the mobile station MS then sends a delivery request ZA to the MMS relay server MMS-RS of the switching component VK. The latter responds with the delivery message ZN containing the useful data object. Finally the user application MMS-UA of the mobile station MS confirms transmission of the useful data object by means of the delivery confirmation message ZBN.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for receiving a useful data object from a switching component, comprising:
   storing, in a mobile station, an indication of a selected communication network in which a useful data object is to be transmitted automatically;
   receiving, by the mobile station, an indication that a useful data object is available for downloading, said receiving to occur when the mobile station is not registered in the selected communication network;
   displaying, for selection by a user of the mobile station, plurality of options for transmission of the useful data object, the plurality of options comprising:
      transmitting the useful data object from the switching component immediately in any communication network;
      transmitting the useful data object from the switching component at a later time;
      transmitting the useful data object from the switching component after registration of the mobile station in the selected communication network, wherein the mobile station is to transmit a request for the useful data object upon registration in the selected communication network;
      forwarding the useful data object to a server or another mobile station; and
      deleting the useful data object on the switching component;
   receiving, from the user, a selection of one option of the plurality of options; and
   receiving the useful data object from the switching component in accordance with the selected option,
   wherein the switching component is a multimedia messaging service relay server (MMS-RS).

2. The method according to claim 1, wherein the mobile station is notified by the switching component when the switching component has a useful data object for the mobile station.

3. The method according to claim 1, wherein the selected communication network is selected as a function of cost of transmitting the useful data object, transmission time for the useful data object, size of the useful data object, the sender of the useful data object, or the nature of the useful data object.

4. The method according to claim 1, further comprising:
   receiving, by the mobile station, a notification from a determination device that the mobile station is registered in the selected communication networks, when it is determined, by the determination device assigned to the mobile station, that the mobile station is registered in the selected communication network.

5. The method according to claim 1, further comprising:
   transmitting, by the mobile station, a delivery request for the useful data object to the switching component; and
   receiving, by the mobile station, the useful data object from the switching component based on the delivery request for the useful data object.

6. The method according to claim 1, wherein the useful data object is transmitted as a multimedia message in the context of the multimedia messaging service between the switching component and the mobile station.

7. The method according to claim 1, wherein the useful data object is sent from a data provision component to the switching component for transmission to the mobile station.

8. The method according to claim 1, wherein at least one of the following information items contained in the useful data object is stored in a storage unit assigned to the mobile station: a status of the transmission process of the useful data object, the selected communication network, a selected parameter(s), notification and messages, information specific to the useful data object.

9. The method according to claim 8, wherein the storage unit assigned to the mobile station is a SIM card or a UICC card with a USIM application.

10. The method according to claim 1, wherein the storing, receiving, and displaying are result of instructions executed by one or more software applications on the mobile station.

11. A mobile station, comprising:
one or more processors; and
one or more non-transitory storage media having instructions that, when executed by the one or more processors, cause the mobile station to:
select, with the aid of a selection device that is assigned to the mobile station, at least one communication network in which a useful data object is to be transmitted automatically;
display, for selection by a user of the mobile station, a plurality of options for transmission of the useful data object, the plurality of options comprising:
transmitting the useful data object from the switching component immediately in any communication network;
transmitting the useful data object from the switching component at a later time;
transmitting the useful data object from the switching component after registration of the mobile station in the selected communication network, wherein the mobile station is to transmit a request for the useful data object upon registration in the selected indication network;
forwarding the useful data object to a server or another mobile station; and
deleting the useful data object on the switching component;
receiving a selection of one option of the plurality of options; and
receiving the useful data object from the switching component in accordance with the selected option,
wherein the switching component is a multimedia messaging service relay server (MMS-RS).

12. A method for receiving a useful data object from a switching component, comprising:
storing in a mobile station an indication of a home network in which a useful data object is to be transmitted to the mobile station automatically;
displaying for the selection by a user of the mobile station a plurality of options for transmission of the useful data object, the plurality of options comprising:
transmitting the useful data object from the switching component immediately in any communication network;
transmitting the useful data object from the switching component at a later time;
transmitting the useful data object from the switching component after registration of the mobile station in the home network, wherein the mobile station is to transmit a request for the useful data object upon registration in the home network;
forwarding useful data object to a server or another mobile station; and
deleting the useful data object on the switching component
receiving, from a user of the mobile station, a selection of one option of the plurality of options; and
receiving the useful data object from the switching component in accordance with the selected option,
wherein the switching component is a multimedia messaging service relay server (MMS-RS).

\* \* \* \* \*